(12) United States Patent
Gupta et al.

(10) Patent No.: US 12,376,083 B2
(45) Date of Patent: Jul. 29, 2025

(54) METHOD AND APPARATUS FOR STATISTICAL MULTIPLEXING FOR FRONTHAUL BANDWIDTH IN OPEN RANDOM ACCESS NETWORKS

(71) Applicant: Rakuten Symphony, Inc., Tokyo (JP)

(72) Inventors: Siddhant Gupta, Bangalore (IN); Ronak Lalwala, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/009,414

(22) PCT Filed: Aug. 30, 2022

(86) PCT No.: PCT/US2022/041950
§ 371 (c)(1),
(2) Date: Dec. 9, 2022

(87) PCT Pub. No.: WO2024/049411
PCT Pub. Date: Mar. 7, 2024

(65) Prior Publication Data
US 2024/0244597 A1    Jul. 18, 2024

(51) Int. Cl.
*H04W 72/0446* (2023.01)
*H04W 74/0833* (2024.01)
*H04W 88/08* (2009.01)

(52) U.S. Cl.
CPC ... *H04W 72/0446* (2013.01); *H04W 74/0833* (2013.01); *H04W 88/085* (2013.01)

(58) Field of Classification Search
None
See application file for complete search history.

(56) References Cited

U.S. PATENT DOCUMENTS

2023/0328712 A1* 10/2023 Singh ............... H04L 27/34
370/329

OTHER PUBLICATIONS

International Search Report dated Dec. 30, 2022 in International Application No. PCT/US22/41950.
Written Opinion dated Dec. 30, 2022 in International Application No. PCT/US22/41950.

* cited by examiner

*Primary Examiner* — Walter J Divito
(74) *Attorney, Agent, or Firm* — Sughrue Mion, PLLC (57) ABSTRACT

A method performed in an O-DU includes dividing a transmission time unit (TTI) into a plurality of symbol units, the TTI corresponding to a permitted time for transmission of data from the O-DU to the O-RU via the fronthaul link. The method further includes allocating a first packet of a first type to a first symbol unit. The method further includes, in response to determining (i) a size of the first packet of the first type is less than a size of the first symbol unit and (ii) a first packet of a second type associated with the first packet of the first type is available for transmission, allocating the first packet of the second type to the first symbol unit. The method further includes transmitting the first symbol unit with the first packet of the first type and the first packet of the second type to the O-RU.

20 Claims, 9 Drawing Sheets

METHOD AND APPARATUS FOR STATISTICAL MULTIPLEXING FOR FRONTHAUL BANDWIDTH IN OPEN RANDOM ACCESS NETWORKS

CROSS REFERENCE TO RELATED APPLICATIONS

This application is a National Stage of Application No. PCT/US2022/041950 filed Aug. 30, 2022.

TECHNICAL FIELD

The present disclosure relates generally to communication systems, and more particularly to methods and apparatuses for statistical multiplexing for fronthaul bandwidth in open radio access networks (O-RAN).

BACKGROUND

Cloud based Radio Access Networks (CRAN) are networks where a significant portion of the RAN layer processing is performed at a centralized unit (CU), located in the cloud on commercial off the shelf servers, while the radio frequency (RF) and real-time critical functions can be processed in the remote radio unit (RU or RRU) and a distributed unit (DU). Sometimes, the DU is also considered to be part of the CU/BBU depending on the functional split. An O-RAN is an example of a CRAN.

For the RU and DU to communicate, an interface called the fronthaul (FH) is provided. 3rd Generation Partnership Project (3GPP) has defined 8 options for the split between the BBU and the RRU among different layers of the protocol stack. One of the splits recently standardized by the O-RAN Alliance is split option 7-2x (Intra-Physical (PHY) layer split). This split has multiple advantages such as simplicity, transport bandwidth scalability, beamforming support, interoperability, support for advanced receivers and inter-cell coordination, lower O-RU complexity, future proofness, interface and functions symmetry.

Although split option 7-2x has relatively low fronthaul (FH) throughput compared to split options 7-1 or split option 8, it is beneficial to reduce the FH throughput rate as the throughput rate has a direct impact on scalability, the transport medium, and the Ethernet cards at the O-RAN-compliant DU (O-DU) and O-RAN-compliant RU (O-RU).

There are no methods defined as part of the available standard specifications which indicate optimization of bandwidth when transmitting control and user plane data packets on the FH link between the O-DU and O-RU. Conventional methods can lead to packet loss, violation of time constraints, and unbalanced load on the FH during a transmission time unit.

Improvements are presented herein. These improvements may also be applicable to other multi-access technologies and the telecommunication standards that employ these technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for optimization of FH bandwidth are disclosed by the present disclosure.

According to exemplary embodiments, a method performed in an O-DU includes dividing a transmission time unit (TTI) into a plurality of symbol units, the TTI corresponding to a permitted time for transmission of data from the O-DU to the O-RU via the fronthaul link. The method further includes allocating a first packet of a first type to a first symbol unit. The method further includes, in response to determining (i) a size of the first packet of the first type is less than a size of the first symbol unit and (ii) a first packet of a second type associated with the first packet of the first type is available for transmission, allocating the first packet of the second type to the first symbol unit. The method further includes transmitting the first symbol unit with the first packet of the first type and the first packet of the second type to the O-RU.

According to exemplary embodiments, a network node connected via a fronthaul link to an Open Radio Access Network (O-RAN) Radio Unit (O-RU) includes at least one memory configured to store computer program code, and at least one processor configured to access the at least one memory and operate as instructed by the computer program code. The computer program code includes dividing code configured to cause at least one of said at least one processor to divide a transmission time unit (TTI) into a plurality of symbol units, the TTI corresponding to a permitted time for transmission of data from the O-DU to the O-RU via the fronthaul link. The computer program code includes first allocating code configured to cause at least one of said at least one processor to allocate a first packet of a first type to a first symbol unit from the plurality of symbol units. The computer program code includes, in response to determining (i) a size of the first packet of the first type is less than a size of the first symbol unit and (ii) a first packet of a second type associated with the first packet of the first type is available for transmission, second allocating code configured to cause at least one of said at least one processor to allocate the first packet of the second type to the first symbol unit. The computer program code includes transmitting code configured to cause at least one of said at least one processor to transmit, via the fronthaul link, the first symbol unit with the first packet of the first type and the first packet of the second type to the O-RU.

According to exemplary embodiments, a non-transitory computer readable medium having instructions stored therein, which when executed by a processor in a network node connected via a fronthaul link to an Open Radio Access Network (O-RAN) Radio Unit (O-RU) cause the process to execute a method that includes dividing a transmission time unit (TTI) into a plurality of symbol units, the TTI corresponding to a permitted time for transmission of data from the O-DU to the O-RU via the fronthaul link. The method further includes allocating a first packet of a first type to a first symbol unit from the plurality of symbol units. The method further includes, in response to determining (i) a size of the first packet of the first type is less than a size of the first symbol unit and (ii) a first packet of a second type associated with the first packet of the first type is available for transmission, allocating the first packet of the second type to the first symbol unit. The method further includes transmitting, via the fronthaul link, the first symbol unit with the first packet of the first type and the first packet of the second type to the O-RU.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects, features, and aspects of embodiments of the disclosure will be apparent from the following description taken in conjunction with the accompanying drawings, in which:

FIGS. 5(B)-6(D) illustrate example symbol units, in accordance with various embodiments of the present disclosure.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Embodiments of the present disclosure are directed to optimizing transmission time and link occupancy of the FH link when transmitting control and user plane data packets between the O-DU and O-RU. In some embodiments, the full FH bandwidth may be utilized per unit of time. For example, based on system parameters (e.g., FH link capacity, Maximum Transmission Unit (MTU) size, In-band and Quadrature (IQ) sample width, C/U plane priority, FH transmission window), per transmission time unit, the method interleaves C/U plane transmission on FH bandwidth. The embodiments of the present disclosure provide the significantly advantageous features of reducing FH throughput.

The O-RAN specification specifies at least the following four planes: user plane (U-plane), control plane (C-plane), synchronization plane (S-plane), and management plane (M-plane). The C-plane messages may include data-associated control information required for processing of user data (e.g., scheduling and beamforming commands). These messages may be sent separately for downlink (DL) related commands and uplink (UL) related commands.

To support coordination of C-Plane and U-Plane timing, the O-RAN interface may specify that C-Plane or U-Plane messages must arrive at the O-RU till the time the C-plane or U-Plane messages fall in their respective window.

The U-Plane O-DU transmission window may be defined by the relationships above based on the O-RU reception window and max transport variation. In some embodiments, this transmission window does not define the exact timing of transmission from the O-DU, and instead, may define the boundaries the U-Plane O-DU transmission operate within. The transmission window may represent the mathematical boundaries imposed on the O-DU as a result of the O-RU, front haul delay, and Transport constraints. The constraints may be defined for any one of O-DU, transport and O-RU based on knowledge of the other two. However, the O-RU constraint may be predefined based on the equipment, transport, and overall network goals.

Figure 3:
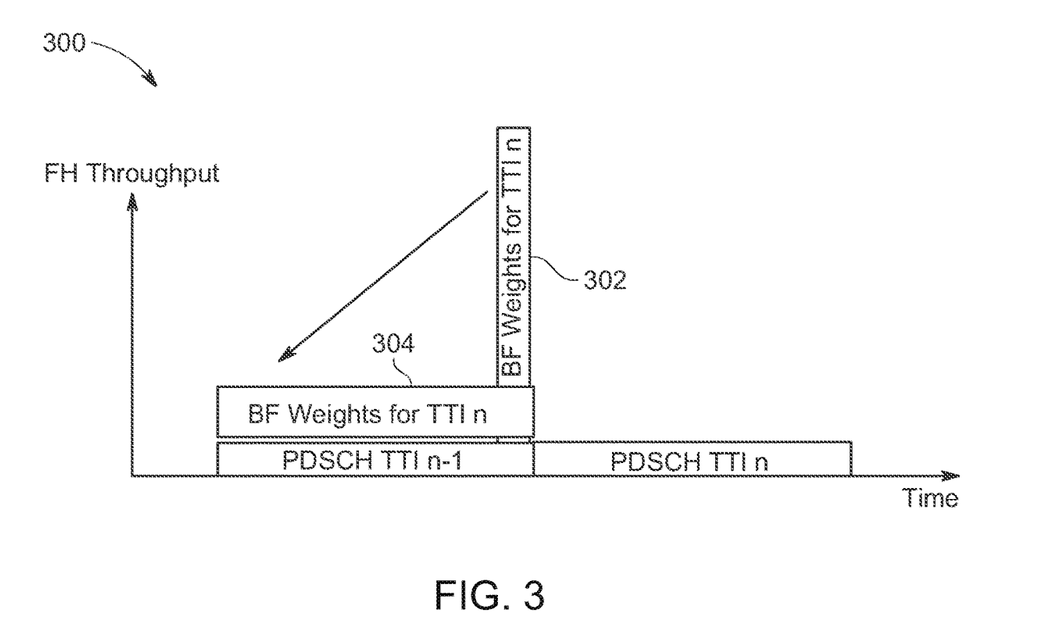
FIG. 3 illustrates an example chart of FH throughput, in accordance with various embodiments of the present disclosure.

The C-plane O-DU transmission window may follow the same concept as the U-plane O-DU transmit window. However, the C-plane O-DU transmission window may be larger in size and therefore, may start much earlier in time compared to the U-plane O-DU transmission window. In certain scenarios, such as sending the beamforming weights in real-time for MIMO application, the C-plane messages may be spread over time to avoid peak throughput. FIG. 3 illustrates an example chart (300) showing the FH throughput in which C-plane messages are transmitted all at once in the same symbol unit (302), and the FH throughput when C-plane messages are spread over time (304). As illustrated in FIG. 3, when the C-plane messages are spread over time (304), the FH throughput is reduced compared to transmitting the C-plane messages all at once in the same symbol unit (302).

Figure 1:
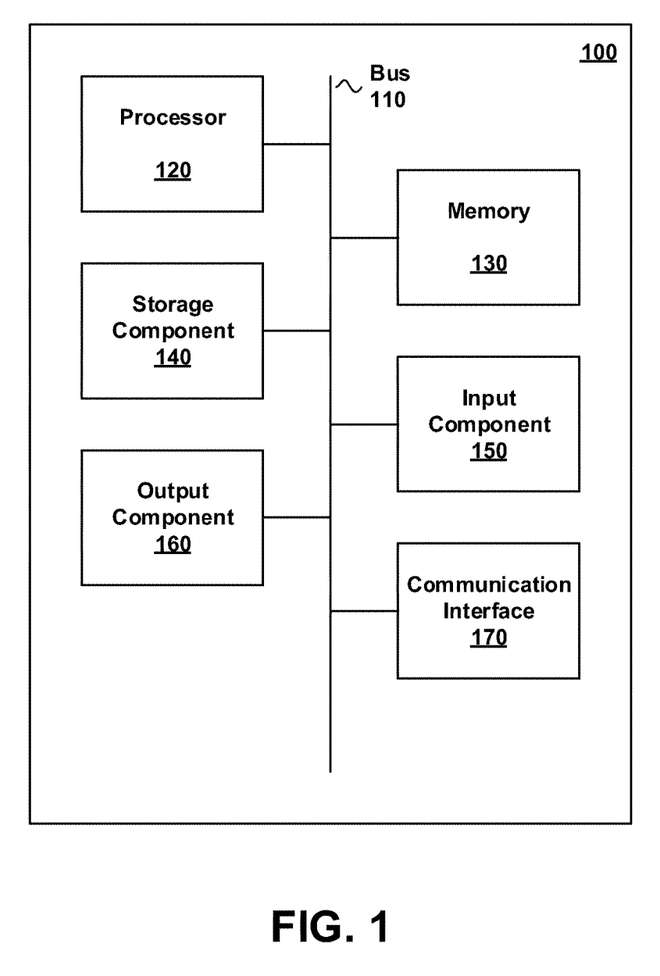
FIG. 1 is a diagram of an example network device in accordance with various embodiments of the present disclosure.

FIG. 1 is diagram of an example device for implementing the methods of the present disclosure. Device 100 may correspond to any type of known computer, server, or data processing device. For example, the device 100 may comprise a processor, a personal computer (PC), a printed circuit board (PCB) comprising a computing device, a mini-computer, a mainframe computer, a microcomputer, a telephonic computing device, a wired/wireless computing device (e.g., a smartphone, a personal digital assistant (PDA)), a laptop, a tablet, a smart device, or any other similar functioning device.

In some embodiments, as shown in FIG. 1, the device 100 may include a set of components, such as a processor 120, a memory 130, a storage component 140, an input component 150, an output component 160, and a communication interface 170.

The bus 110 may comprise one or more components that permit communication among the set of components of the device 100. For example, the bus 110 may be a communication bus, a cross-over bar, a network, or the like. Although the bus 110 is depicted as a single line in FIG. 1, the bus 110 may be implemented using multiple (two or more) connections between the set of components of device 100. The disclosure is not limited in this regard.

The device 100 may comprise one or more processors, such as the processor 120. The processor 120 may be implemented in hardware, firmware, and/or a combination of hardware and software. For example, the processor 120 may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The processor 120 also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The processor 120 may control overall operation of the device 100 and/or of the set of components of device 100 (e.g., the memory 130, the storage component 140, the input component 150, the output component 160, the communication interface 170).

The device 100 may further comprise the memory 130. In some embodiments, the memory 130 may comprise a random access memory (RAM), a read only memory (ROM), an electrically erasable programmable ROM (EEPROM), a flash memory, a magnetic memory, an optical memory, and/or another type of dynamic or static storage device. The memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further comprise the input component 150. The input component 150 may include one or more components that permit the device 100 to receive information, such as via user input (e.g., a touch screen, a keyboard, a keypad, a mouse, a stylus, a button, a switch, a microphone, a camera, and the like). Alternatively or additionally, the input component 150 may include a sensor for sensing information (e.g., a global positioning system (GPS) component, an accelerometer, a gyroscope, an actuator, and the like).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, and the like).

The device 100 may further comprise the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as FlashLinQ, WiMedia, Bluetooth, ZigBee, Wi-Fi, LTE, 5G, and the like. In other embodiments, the communication interface 170 may include an Ethernet interface, an optical interface, a coaxial interface, an infrared interface, a radio frequency (RF) interface, or the like.

The device 100 may be included in the core network 240 and perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally or alternatively, a set of (one or more) components shown in FIG. 1 may perform one or more functions described as being performed by another set of components shown in FIG. 1.

Figure 2:
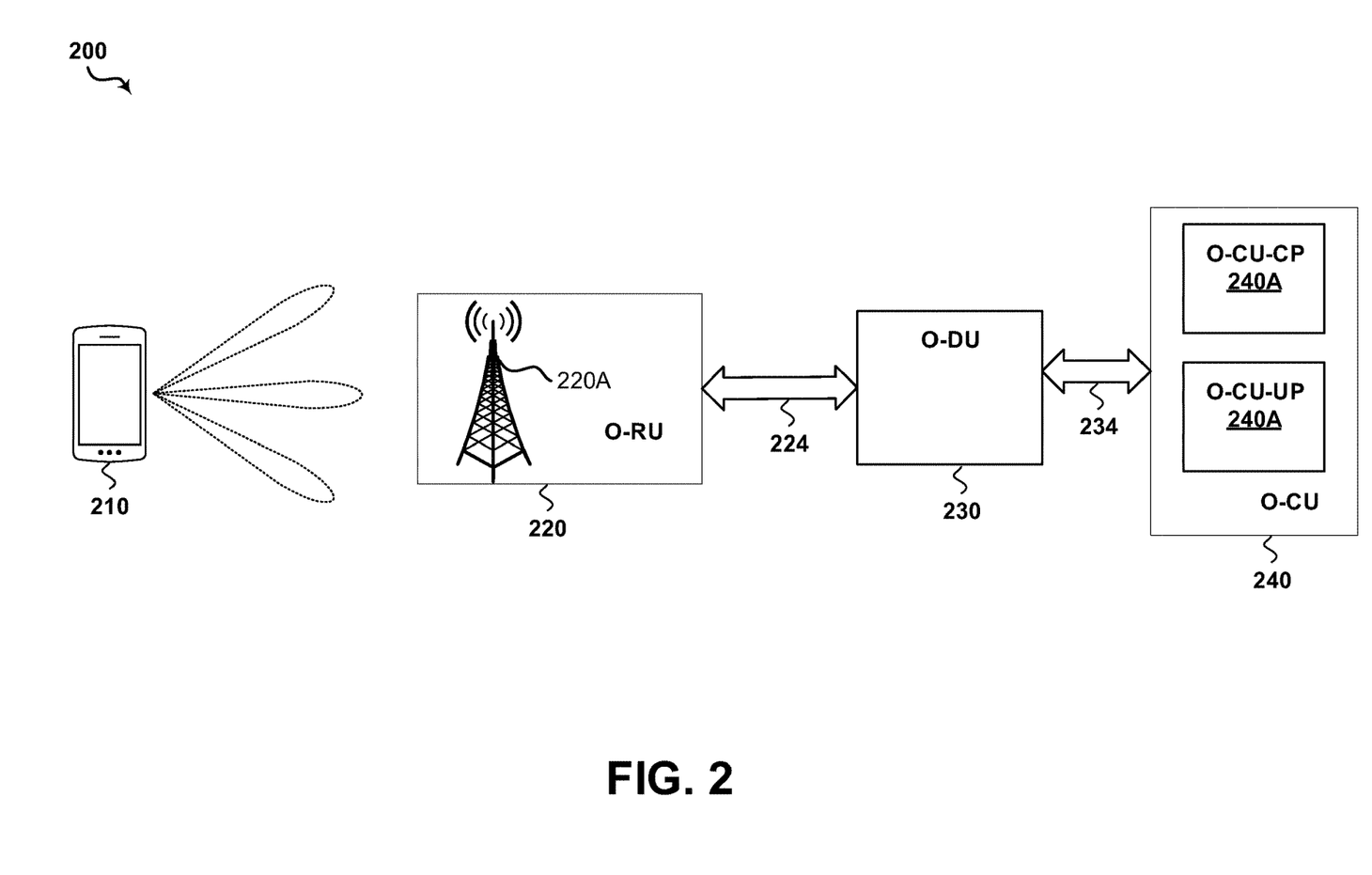
FIG. 2 is a schematic diagram of an example O-RAN communications system, in accordance with various embodiments of the present disclosure.

FIG. 2 is a diagram illustrating an example O-RAN communication system 200, according to various embodiments of the present disclosure. The O-RAN communication system 200 may include one or more user equipment (UE) 210, one or more O-RAN Radio Units (O-RU) 220 that includes one or more base stations 220a, one or more O-RAN Distribution Units (O-DU) 230, and one or more O-RAN Centralized Units (O-CU) 240.

Examples of UEs 210 may include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similarly functioning device. Some of the one or more UEs 210 may be referred to as Internet-of-Things (IOT) devices (e.g., parking meter, gas pump, toaster, vehicles, heart monitor, etc.). The one or more UEs 210 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile agent, a client, or some other suitable terminology.

The one or more base stations 220A of the O-RU 220 may wirelessly communicate with the one or more UEs 210. Each base station of the one or more base stations 220A may provide communication coverage to one or more UEs 210 located within a geographic coverage area of that base station 220A. In some embodiments, as shown in FIG. 2, the base station 220A may transmit one or more beamformed signals to the one or more UEs 210 in one or more transmit directions. The one or more UEs 210 may receive the beamformed signals from the base station 220A in one or more receive directions. Alternatively or additionally, the one or more UEs 210 may transmit beamformed signals to the base station 220 in one or more transmit directions. The base station 220A may receive the beamformed signals from the one or more UEs 210 in one or more receive directions.

The one or more base stations 220A may include macrocells (e.g., high power cellular base stations) and/or small cells (e.g., low power cellular base stations). The small cells may include femtocells, picocells, and microcells. A base station 220A, whether a macrocell or a large cell, may include and/or be referred to as an access point (AP), an evolved (or evolved universal terrestrial radio access network (E-UTRAN)) Node B (eNB), a next-generation Node B (gNB), or any other type of base station known to one of ordinary skill in the art.

In some embodiments, the O-RU 220 may be connected to the O-DU 230 via a FH link 224. The FH link may be a 25 Gbps line in which User Plane (U-plane) and Control Plane (C-Plane) packets are downloaded from the O-DU 230 to the O-RU 220. In some embodiments, the O-DU 230 may be connected to the O-CU 240 via a midhaul link 234. The O-CU 240 may include an O-CU Control Plane (O-CU-CP) packet generator 240A and an O-CU User Plane (O-CU-UP) packet generator 240B. C-plane and U-plane packets may originate from the O-CU-CP packet generator 240A and the O-CU-UP packet generator 240B, respectively.

Figure 4A:
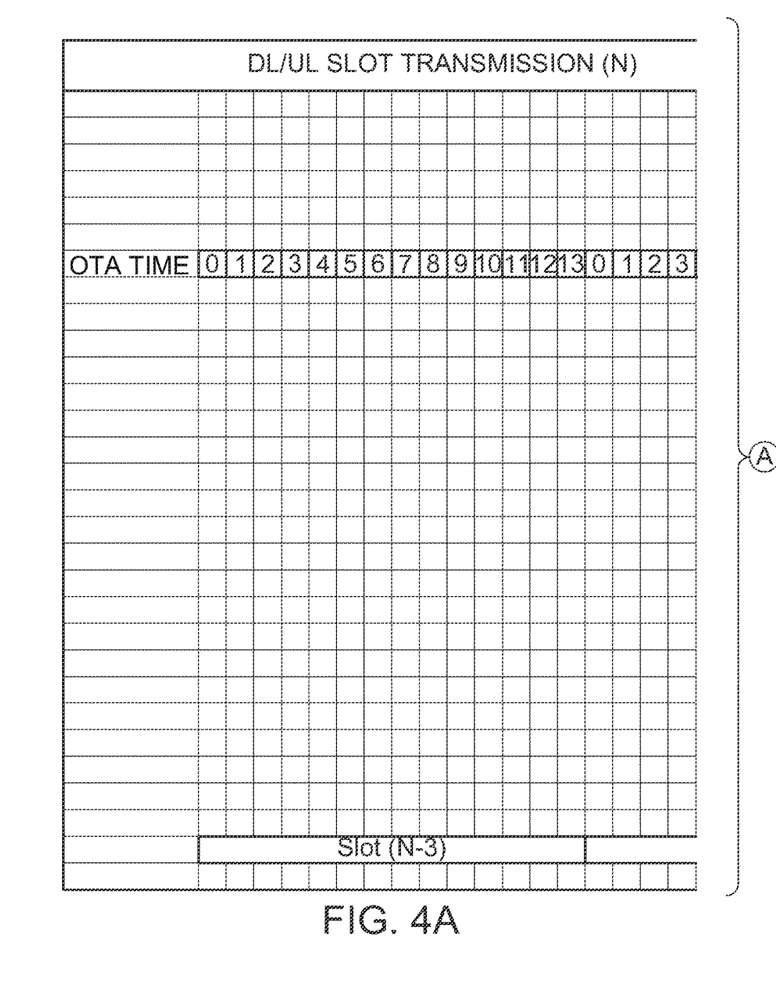
FIGS. 4A and 4B illustrate an example transmission time window, in accordance with various embodiments of the present disclosure.
Figure 4B:
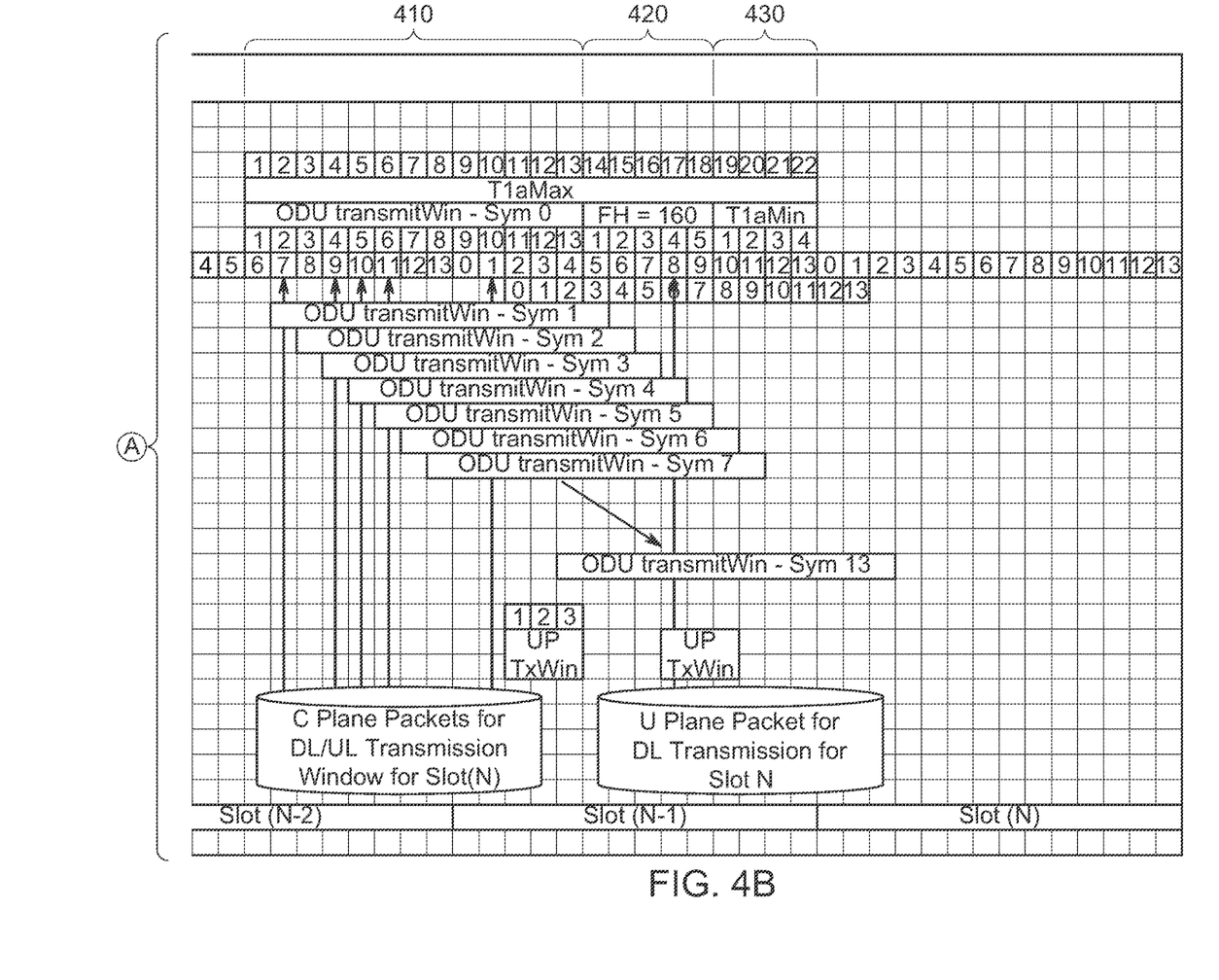

FIGS. 4A and 4B illustrates an example transmission time window. As illustrated in FIGS. 4A and 4B, the transmission time window includes a length of T1aMax The transmission time window may include a transmission time interval (TTI) 410. The transmission time window may further include a FH processing interval 420 representing the time for data (e.g., packets) to travel from the O-DU to the O-RU via the FH link. The transmission time window may further include a O-RU processing time TlaMin 430 representing the time for processing data received at the O-RU. At the expiration of time 430, the O-RU may transmit received data over the network. For example, at the expiration of time 430, the O-RU may transmit data to one or more UEs 210 (FIG. 2). Accordingly, if the O-DU transmits U-plane or C-plane packets at a timing such that the O-RU is unable to process the received packets within the interval 430, the O-RU may not transmit the packets at a timing in accordance with the O-RAN standard.

Figure 5:
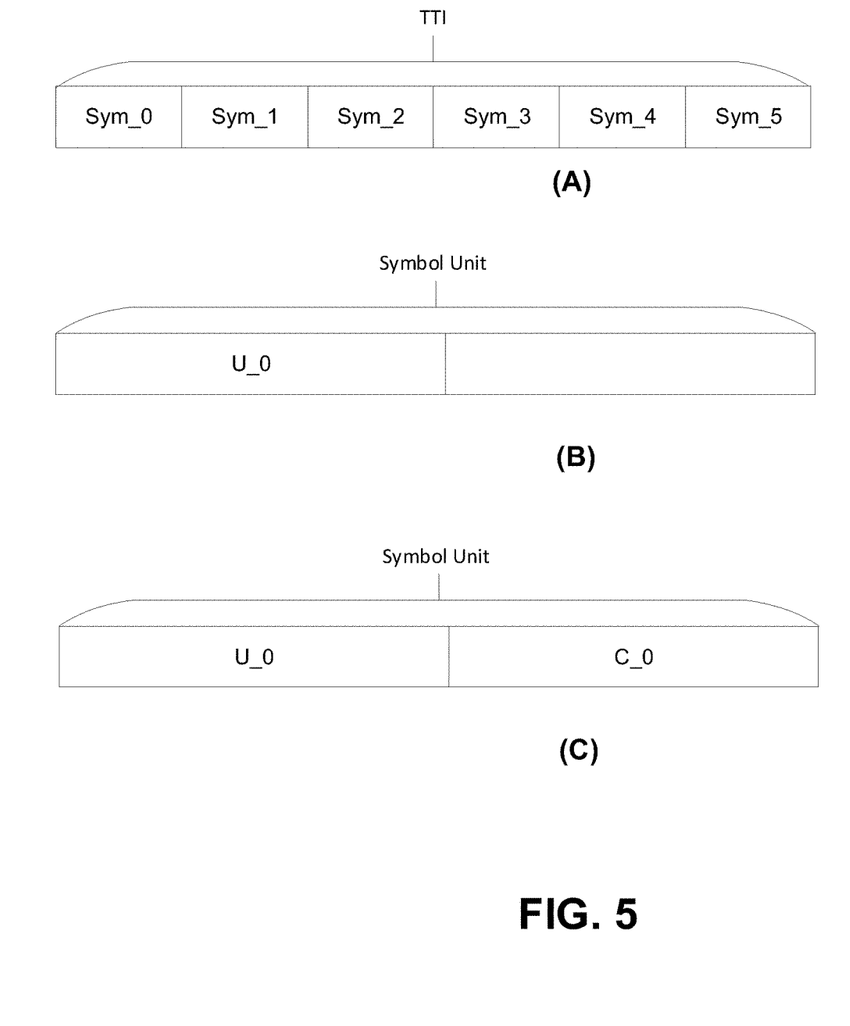
FIG. 5(A) illustrates an example transmission time interval, in accordance with various embodiments of the present disclosure.

In some embodiments, the TTI 410 may be divided into one or more symbol units as illustrated in FIG. 5(A). For example, as illustrated in FIG. 5(A), the TTI is divided into symbol units Sym_0 to Sym_5. Each symbol unit may be the same size. Packets may be spread over the symbol units to avoid FH peak throughput. The symbol units may first be allocated packets with higher priority. For example, the U-plane packets may have higher priority than C-plane packets, and thus, a U-plane packet may be allocated first to a symbol unit while the C-plane packets are spread over the symbol units. In another example, C-plane packets may have higher priority than U-plane packets and thus, a C-plane packet may be allocated first to a symbol unit while the U-plane packets are spread over the symbol units.

In some embodiments, the spreading of packets to avoid peak throughput may be performed in accordance with the following steps. The following steps may accept as input one or more parameters including FH MTU size, FH line rate, and Sample IQ Width.

Step 1: Compute total user plane time to be reserved per symbol unit.

$$\text{packetsize}_{uplane} = IQ_{width} * BW * N_{sc} * 2 * N_{layer} * N_{carrier} \quad \text{Eq. (1)}$$

In Eq. (1), $IQ_{width}$ corresponds to user plane data size, BW corresponds to bandwidth, $N_{SC}$ corresponds to a number of subcarriers, $N_{layer}$ corresponds to a number of layers, and $N_{carrier}$ corresponds to a number of carriers.

Step 2: Compute total control plane time available per symbol unit.

$$\text{time}_{uplane} = \text{packsize}_{uplane} * \frac{10e6}{\text{LineRate}_{FH}} + \frac{\text{Duration}_{slot}}{N Sym_{slot}} \quad \text{Eq. (2)}$$

$$\text{time}_{cplane} = \frac{\text{Duration}_{slot}}{N Sym_{slot}} - \text{time}_{uplane} \quad \text{Eq. (3)}$$

In Eqs. (2) and (3), $\text{LineRate}_{FH}$ corresponds to the line rate of the FH link, $\text{Duration}_{slot}$ corresponds to a total duration of a TTI, and $NSym_{slot}$ corresponds to a number of symbol units per TTI.

Step 3: Compute control plane packet size available per symbol unit.

$$\text{packetsize}_{cplane} = \text{time}_{cplane} * \frac{\text{LineRate}_{FH}}{10e6} \quad \text{Eq. (4)}$$

FIG. 5(B) illustrates an example allocation of packets in which U-plane packets have higher priority than C-plane packets. The symbol unit illustrated in FIG. 5(B) may correspond to symbol unit Sym_0. The U-plane packet U_0 may be first allocated to Sym_0. Since the size of U_0 is less than the size of the Sym_0, a C-plane packet may be allocated to Sym_0 to use up the remaining bandwidth of Sym_0. For example, FIG. 5(C) illustrates C-plane packet C_0 allocated to Sym_0. As illustrated in FIG. 5(C), the size of C-plane packet C_0 fills up the remaining bandwidth of Sym_0 (e.g., C_0 packet size=$\text{packetsize}_{cplane}$).

Figure 6:
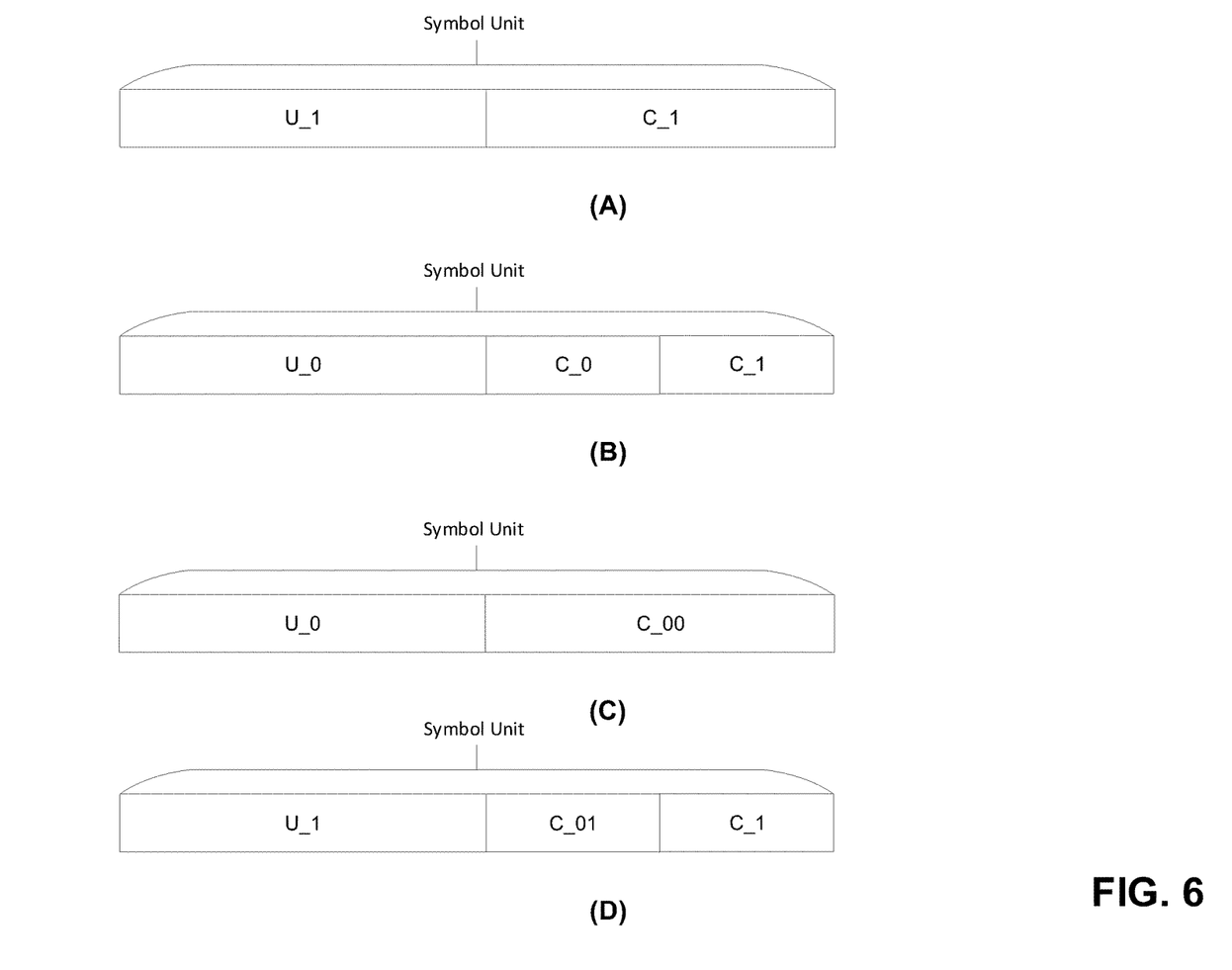

FIG. 6(A) illustrates an example of allocating packets to another symbol unit such as symbol unit Sym_1. As illustrated in FIG. 6(A), Sym_1 is allocated U-plane packet U_1. Since the size of packet of U_1 is less than the size of Sym_1, another C-plane packet may be allocated to Sym_1.

For example, as illustrated in FIG. 6(A), Sym_1 is allocated C-plane packet C_1 to fill up the remaining bandwidth of Sym_1 (e.g., C_0 packet size=$\text{packetsize}_{cplane}$).

FIG. 6(B) illustrates another example in which more than one C-plane packet is allocated to a symbol unit. The symbol unit illustrated in FIG. 6(B) may correspond to symbol unit Sym_0. As illustrated in FIG. 6(B), Sym_0 is allocated control plane packets C_0 and C_1 to fill the remaining bandwidth of Sym_0 after U-plane packet U_0 is allocated to Sym_0 (e.g., C_0 packet size+C_1 packet size=$\text{packetsize}_{cplane}$).

FIGS. 6(C) and (D) illustrate another example in which a C-plane packet is divided into variable size chunks. The symbol units in FIGS. 6(C) and (D) may correspond to symbol units Sym_0 and Sym_1, respectively. After U-plane packet U_0 is allocated to Sym_0, C-plane packet C_0 may be too large to allocate to the remaining bandwidth of Sym_0 (e.g., C_0 packet size>$\text{packetsize}_{cplane}$). Accordingly, C-plane packet C_0 may be divided into variable size chunks C_00 and C_01. The packet sizes of C_00 and C_01 may be different from each other. As illustrated in FIG. 6(C), C_00 may be allocated to Sym_0 to use the remaining bandwidth of Sym_0 after U-plane packet U_0 is allocated to Sym_0. In FIG. 6(D), after U-plane packet U_1 is allocated to Sym_0, C_01 may be allocated to Sym_0. If C_01 does not fill up the remaining bandwidth of Sym_1 (e.g., C_01 packet size<$\text{packetsize}_{cplane}$), another C-plane packet such as packet C_1 may also be allocated to Sym_1 to fill up the remaining bandwidth of Sym_1 (e.g, e.g., C_01 packet size+C_1 packet size=$\text{packetsize}_{cplane}$).

Although FIGS. 5(B)-6(D) illustrate examples in which the U-plane has higher priority than the C-plane packets, in some embodiments, the C-plane packets have a higher priority than the U-plane packets. When the C-plane packets have a higher priority, the C-plane packets may be allocated first to the symbol units, where the U-plane packets are spread over the symbol units.

Figure 7:
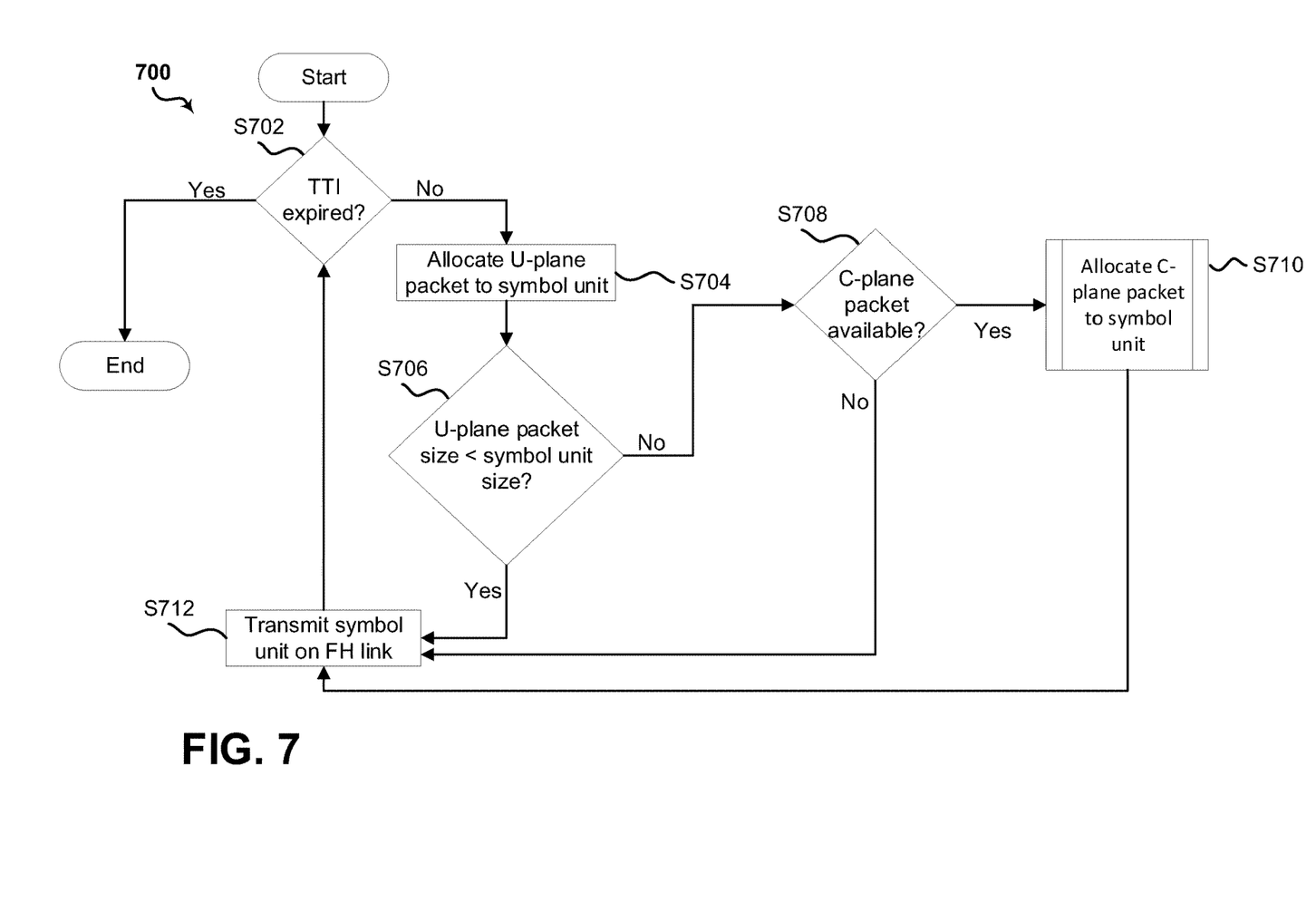
FIG. 7 is a flow chart of an example process for allocating packets to a symbol unit, in accordance with various embodiments of the present disclosure.

FIG. 7 illustrates a flow chart of an example process 700 for allocating packets to a symbol unit. In some embodiments, the process illustrated in FIG. 7 is performed at O-DU 230. The process may start at step S702 where it is determined if a TTI is expired. If a TTI is not expired, the process flow proceeds to step S704 to allocate U-plane packets to a symbol unit. If the TTI is expired, then the process illustrated in FIG. 7 is completed.

At step S704, a U-plane packet is allocated to a symbol unit as illustrated in FIG. 5(B), for example. The process proceeds to step S706 where it is determined whether the U-plane packet size is less than the symbol unit size. For example, if the U-plane packet size is not less than the symbol unit size, the symbol unit has no further bandwidth available for allocating further packets, and the process proceeds from step S706 to step S712 to transmit the symbol unit on the FH link. The process proceeds from step S712 to step S702.

If the U-plane packet size is less than the symbol unit size, the process proceeds from step S706 to step S708 to determine if C-plane packets are available for transmission. If no C-plane packets are available for transmission, the process proceeds to step S712. If one or more C-plane packets are available for transmission, the process proceeds to step S710 to perform a C-plane packet allocation process as illustrated in FIG. 8.

Figure 8:
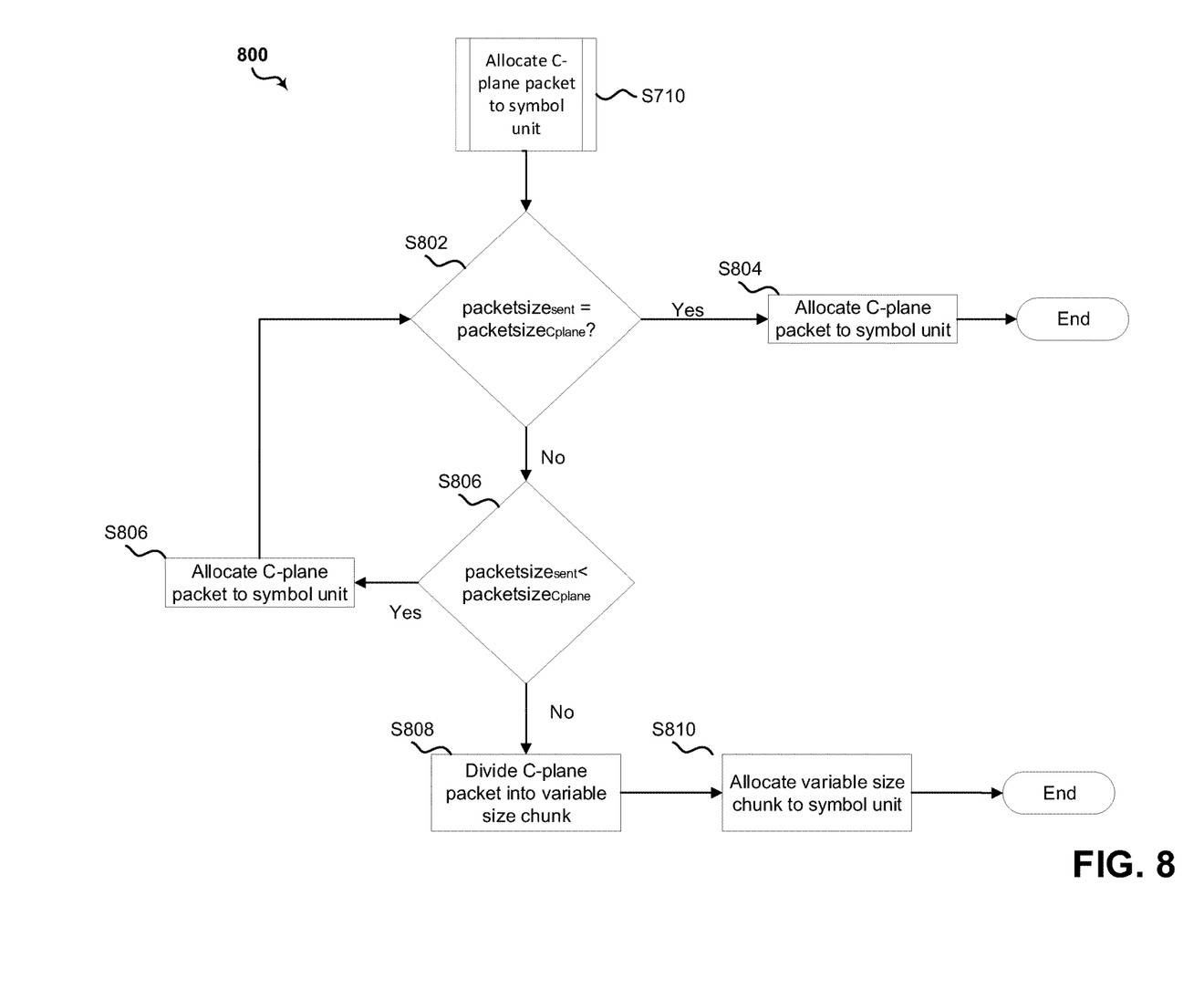
FIG. 8 is a flow chart of an example C-plane allocation process, in accordance with various embodiments of the present disclosure.

FIG. 8 illustrates an embodiment of the C-plane allocation process performed at step S710. In some embodiments, the process illustrated in FIG. 8 is performed at O-DU 230. The process may start at step S802, where it is determined whether a C-plane packet size (packetsize$_{sent}$) is equal to a remaining bandwidth of a symbol unit (packetsize$_{cplane}$). If it is determined the C-plane packet size is equal to the remaining bandwidth of the symbol unit, the process proceeds to step S804 where the C-plane packet is allocated to the symbol unit. For example, as illustrated in FIG. 5(C), after U-plane packet U_0 is allocated to the symbol unit, the C-plane packet C_0 is allocated to the symbol unit to fill the remaining bandwidth of the symbol unit.

If it is determined the C-plane packet size is not equal to the remaining bandwidth of the symbol unit, the process proceeds from step S802 to step S806 to determine whether the C-plane packet size is less than the remaining bandwidth of the symbol unit. If it is determined the C-plane packet size is less than the remaining bandwidth of the symbol unit, the process proceeds to step S806 where the C-plane packet is allocated to the symbol unit. After step S806, the symbol unit still has remaining bandwidth. Accordingly, the process proceeds from step S806 to S802 to allocate another C-plane packet to the symbol unit. For example as illustrated in FIG. 6(B), at least two C-plane packets are allocated to the symbol unit.

If it is determined the C-plane packet size is not less than the remaining bandwidth of the symbol unit, the process proceeds from step S806 to step S808 where the C-plane packet is divided into to a variable size chunk. The process proceeds to step S810 to allocate the variable size chunk to the symbol unit. For example, as illustrated in FIGS. 6(C) and (D), the C-plane packet C_0 is divided into variable size chunks C_00 and C_01. At step S810, the variable size chunk C_00 may be allocated to a first symbol unit, where the variable size chunk C_01 may be allocated to a second symbol unit upon performance of the allocation process illustrated in FIG. 7.

Although FIGS. 7 and 8 illustrate embodiments in which the U-plane has higher priority than the C-plane packets, in other embodiments, the C-plane packets have a higher priority than the U-plane packets.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

The above disclosure also encompasses the embodiments listed below:

(1) A method performed in an Open Radio Access Network (O-RAN) Distributed Unit (O-DU) connected via a fronthaul link to a O-RAN Radio Unit (O-RU), includes: dividing a transmission time unit (TTI) into a plurality of symbol units, the TTI corresponding to a permitted time for transmission of data from the O-DU to the O-RU via the fronthaul link: allocating a first packet of a first type to a first symbol unit from the plurality of symbol units: in response to determining (i) a size of the first packet of the first type is less than a size of the first symbol unit and (ii) a first packet of a second type associated with the first packet of the first type is available for transmission, allocating the first packet of the second type to the first symbol unit; and transmitting, via the fronthaul link, the first symbol unit with the first packet of the first type and the first packet of the second type to the O-RU.

(2) The method according to feature (1), in which in response to determining a size of the first packet of the second type is larger than a size of the first symbol unit minus a size of the first packet of the first type, the first packet of the second type is divided into at least a first variable size chunk and a second variable size chunk, and in which the first variable size chunk is allocated to the first symbol unit.

(3) The method according to feature (1) or (2), in which the second variable size chunk is allocated to a second symbol unit from the plurality of symbol units, and in which the second symbol unit is allocated a second packet of the first type.

(4) The method according to feature (3), in which in response to determining a size of the second packet of the first type plus the size of the second variable size chuck is less than a size of the second symbol unit, the second symbol unit is allocated a second packet of the second type.

(5) The method according to any one of features (1)-(4), in which in response to determining a size of the first packet of the second type is less than a size of the first symbol unit minus a size of the first packet of the first type, the first symbol unit is further allocated a second packet of the second type.

(6) The method according to any one of features (1)-(5), in which a packet of the first type is a user plane packet, and a packet of the second type is a control plane packet.

(7) The method according to any one of features (1)-(6), in which the packet of the first type is a control plane packet, and the packet of the second type is a user plane packet.

(8) A network node connected via a fronthaul link to an Open Radio Access Network (O-RAN) Radio Unit (O-RU), includes: at least one memory configured to store computer program code: and at least one processor configured to access said at least one memory and operate as instructed by said computer program code, said computer program code including: dividing code configured to cause at least one of said at least one processor to divide a transmission time unit (TTI) into a plurality of symbol units, the TTI corresponding to a permitted time for transmission of data from the O-DU to the O-RU via the fronthaul link, first allocating code configured to cause at least one of said at least one processor to allocate a first packet of a first type to a first symbol unit from the plurality of symbol units, in response to determining (i) a size of the first packet of the first type is less than a size of the first symbol unit and (ii) a first packet of a second type associated with the first packet of the first type is available for transmission, second allocating code configured to cause at least one of said at least one processor to allocate the first packet of the second type to the first symbol unit, and transmitting code configured to cause at least one of said at least one processor to transmit, via the fronthaul link, the first symbol unit with the first packet of the first type and the first packet of the second type to the O-RU.

(9) The network node according to feature (8), in which in response to determining a size of the first packet of the second type is larger than a size of the first symbol unit minus a size of the first packet of the first type, the first packet of the second type is divided into at least a first variable size chunk and a second variable size chunk, and in which the first variable size chunk is allocated to the first symbol unit.

(10) The network node according to feature (9), in which the second variable size chunk is allocated to a second symbol unit from the plurality of symbol units, and in which the second symbol unit is allocated a second packet of the first type.

(11) The network node according to feature (10), in which in response to determining a size of the second packet of the first type plus the size of the second variable size chuck is less than a size of the second symbol unit, the second symbol unit is allocated a second packet of the second type.

(12) The network according to any one of features (8)-(11), in which in response to determining a size of the first packet of the second type is less than a size of the first symbol unit minus a size of the first packet of the first type, the first symbol unit is further allocated a second packet of the second type.

(13) The network node according to any one of features (8)-(12), in which a packet of the first type is a user plane packet, and a packet of the second type is a control plane packet.

(14) The network node according to any one of features (8)-(13), in which the packet of the first type is a control plane packet, and the packet of the second type is a user plane packet.

(15) A non-transitory computer readable medium having instructions stored therein, which when executed by a processor in a network node connected via a fronthaul link to an Open Radio Access Network (O-RAN) Radio Unit (O-RU) cause the process to execute a method including: dividing a transmission time unit (TTI) into a plurality of symbol units, the TTI corresponding to a permitted time for transmission of data from the O-DU to the O-RU via the fronthaul link: allocating a first packet of a first type to a first symbol unit from the plurality of symbol units: in response to determining (i) a size of the first packet of the first type is less than a size of the first symbol unit and (ii) a first packet of a second type associated with the first packet of the first type is available for transmission, allocating the first packet of the second type to the first symbol unit: and transmitting, via the fronthaul link, the first symbol unit with the first packet of the first type and the first packet of the second type to the O-RU.

(16) The non-transitory computer readable medium according to feature (15), in which in response to determining a size of the first packet of the second type is larger than a size of the first symbol unit minus a size of the first packet of the first type, the first packet of the second type is divided into at least a first variable size chunk and a second variable size chunk, and in which the first variable size chunk is allocated to the first symbol unit.

(17) The non-transitory computer readable medium according to feature (16), in which the second variable size chunk is allocated to a second symbol unit from the plurality of symbol units, and in which the second symbol unit is allocated a second packet of the first type.

(18) The non-transitory computer readable medium according to feature (17), in which in response to determining a size of the second packet of the first type plus the size of the second variable size chuck is less than a size of the second symbol unit, the second symbol unit is allocated a second packet of the second type.

(19) The non-transitory computer readable medium according to any one of features (15)-(18), in which in response to determining a size of the first packet of the second type is less than a size of the first symbol unit minus a size of the first packet of the first type, the first symbol unit is further allocated a second packet of the second type.

(20) The non-transitory computer readable medium according to any one of features (15)-(19), in which a packet of the first type is a user plane packet, and a packet of the second type is a control plane packet.

What is claimed is:

1. A method performed in an Open Radio Access Network (O-RAN) Distributed Unit (O-DU) connected via a fronthaul link to a O-RAN Radio Unit (O-RU), comprising:
    dividing a transmission time unit (TTI) into a plurality of symbol units, the TTI corresponding to a permitted time for transmission of data from the O-DU to the O-RU via the fronthaul link:
    allocating a first packet of a first type to a first symbol unit from the plurality of symbol units:
    in response to determining (i) a size of the first packet of the first type is less than a size of the first symbol unit and (ii) a first packet of a second type associated with the first packet of the first type is available for transmission, allocating the first packet of the second type to the first symbol unit; and
    transmitting, via the fronthaul link, the first symbol unit with the first packet of the first type and the first packet of the second type to the O-RU.

2. The method according to claim 1, wherein in response to determining a size of the first packet of the second type is larger than a size of the first symbol unit minus a size of the first packet of the first type, the first packet of the second type is divided into at least a first variable size chunk and a second variable size chunk, and wherein the first variable size chunk is allocated to the first symbol unit.

3. The method according to claim 2, wherein the second variable size chunk is allocated to a second symbol unit from the plurality of symbol units, and wherein the second symbol unit is allocated a second packet of the first type.

4. The method according to claim 3, wherein in response to determining a size of the second packet of the first type plus the size of the second variable size chuck is less than a size of the second symbol unit, the second symbol unit is allocated a second packet of the second type.

5. The method according to claim 1, wherein in response to determining a size of the first packet of the second type is less than a size of the first symbol unit minus a size of the first packet of the first type, the first symbol unit is further allocated a second packet of the second type.

6. The method according to claim 1, wherein a packet of the first type is a user plane packet, and a packet of the second type is a control plane packet.

7. The method according to claim 1, wherein the packet of the first type is a control plane packet, and the packet of the second type is a user plane packet.

8. A network node connected via a fronthaul link to an Open Radio Access Network (O-RAN) Radio Unit (O-RU), comprising:
    at least one memory configured to store computer program code; and
    at least one processor configured to access said at least one memory and operate as instructed by said computer program code, said computer program code including:
        dividing code configured to cause at least one of said at least one processor to divide a transmission time unit (TTI) into a plurality of symbol units, the TTI corresponding to a permitted time for transmission of data from the O-DU to the O-RU via the fronthaul link, first allocating code configured to cause at least one of said at least one processor to allocate a first packet of a first type to a first symbol unit from the plurality of symbol units, in response to determining (i) a size of the first packet of the first type is less than a size of the first symbol unit and (ii) a first packet of a second type associated with the first packet of the first type is available for transmission, second allocating code configured to cause at least one of said at least one processor to allocate the first packet of the second type to the first symbol unit, and transmitting code configured to cause at least one of said at least one processor to transmit, via the fronthaul link, the first symbol unit with the first packet of the first type and the first packet of the second type to the O-RU.

9. The network node according to claim 8, wherein in response to determining a size of the first packet of the second type is larger than a size of the first symbol unit minus a size of the first packet of the first type, the first packet of the second type is divided into at least a first variable size chunk and a second variable size chunk, and wherein the first variable size chunk is allocated to the first symbol unit.

10. The network node according to claim 9, wherein the second variable size chunk is allocated to a second symbol unit from the plurality of symbol units, and wherein the second symbol unit is allocated a second packet of the first type.

11. The network node according to claim 10, wherein in response to determining a size of the second packet of the first type plus the size of the second variable size chuck is less than a size of the second symbol unit, the second symbol unit is allocated a second packet of the second type.

12. The network according to claim 8, wherein in response to determining a size of the first packet of the second type is less than a size of the first symbol unit minus a size of the first packet of the first type, the first symbol unit is further allocated a second packet of the second type.

13. The network node according to claim 8, wherein a packet of the first type is a user plane packet, and a packet of the second type is a control plane packet.

14. The network node according to claim 8, wherein the packet of the first type is a control plane packet, and the packet of the second type is a user plane packet.

15. A non-transitory computer readable medium having instructions stored therein, which when executed by a processor in a network node connected via a fronthaul link to an Open Radio Access Network (O-RAN) Radio Unit (O-RU) cause the process to execute a method comprising:

dividing a transmission time unit (TTI) into a plurality of symbol units, the TTI corresponding to a permitted time for transmission of data from the O-DU to the O-RU via the fronthaul link;

allocating a first packet of a first type to a first symbol unit from the plurality of symbol units;

in response to determining (i) a size of the first packet of the first type is less than a size of the first symbol unit and (ii) a first packet of a second type associated with the first packet of the first type is available for transmission, allocating the first packet of the second type to the first symbol unit; and transmitting, via the fronthaul link, the first symbol unit with the first packet of the first type and the first packet of the second type to the O-RU.

16. The non-transitory computer readable medium according to claim 15, wherein in response to determining a size of the first packet of the second type is larger than a size of the first symbol unit minus a size of the first packet of the first type, the first packet of the second type is divided into at least a first variable size chunk and a second variable size chunk, and wherein the first variable size chunk is allocated to the first symbol unit.

17. The non-transitory computer readable medium according to claim 16, wherein the second variable size chunk is allocated to a second symbol unit from the plurality of symbol units, and wherein the second symbol unit is allocated a second packet of the first type.

18. The non-transitory computer readable medium according to claim 17, wherein in response to determining a size of the second packet of the first type plus the size of the second variable size chuck is less than a size of the second symbol unit, the second symbol unit is allocated a second packet of the second type.

19. The non-transitory computer readable medium according to claim 15, wherein in response to determining a size of the first packet of the second type is less than a size of the first symbol unit minus a size of the first packet of the first type, the first symbol unit is further allocated a second packet of the second type.

20. The non-transitory computer readable medium according to claim 15, wherein a packet of the first type is a user plane packet, and a packet of the second type is a control plane packet.

* * * * *